Figures 2, 4, 5:
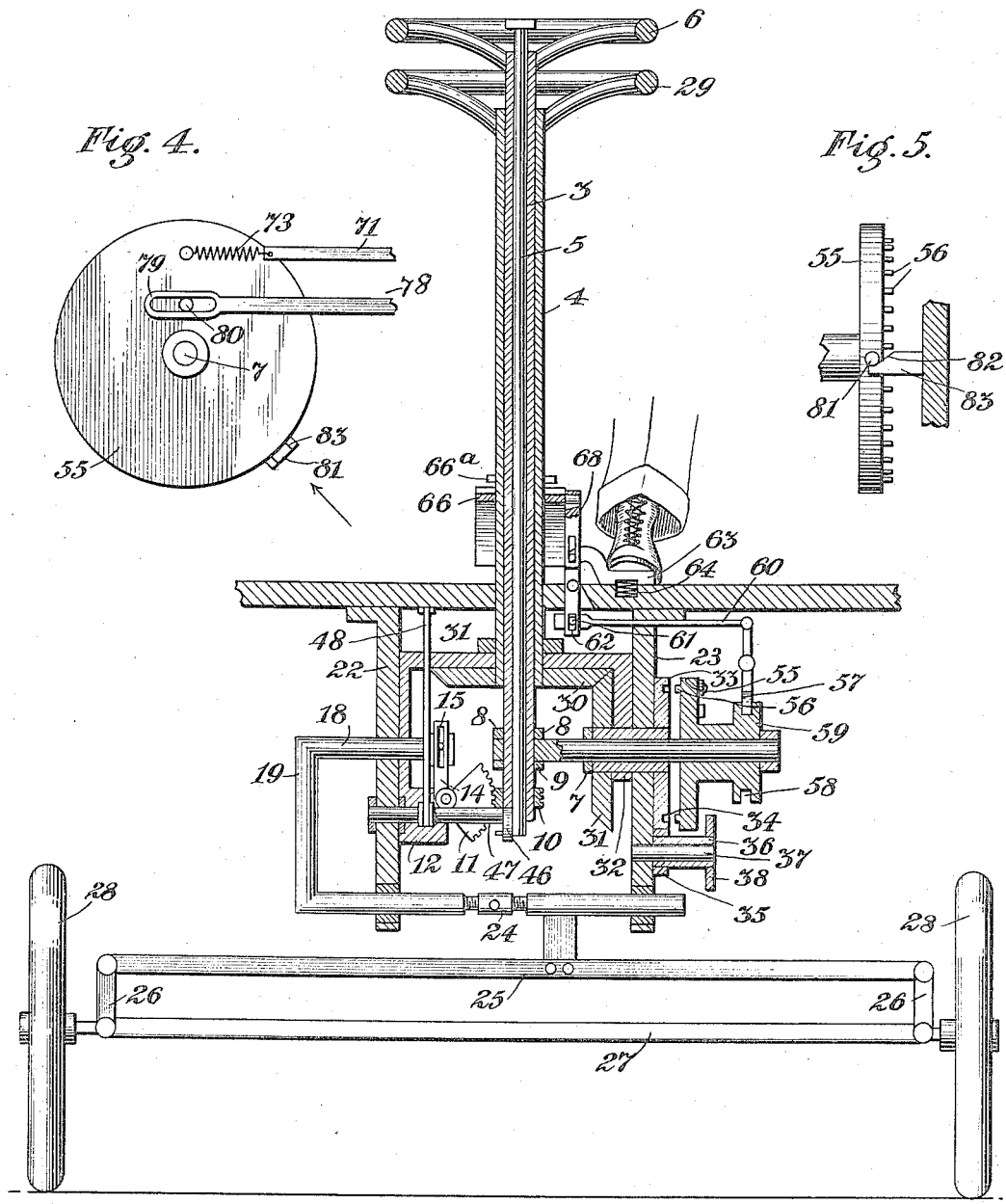

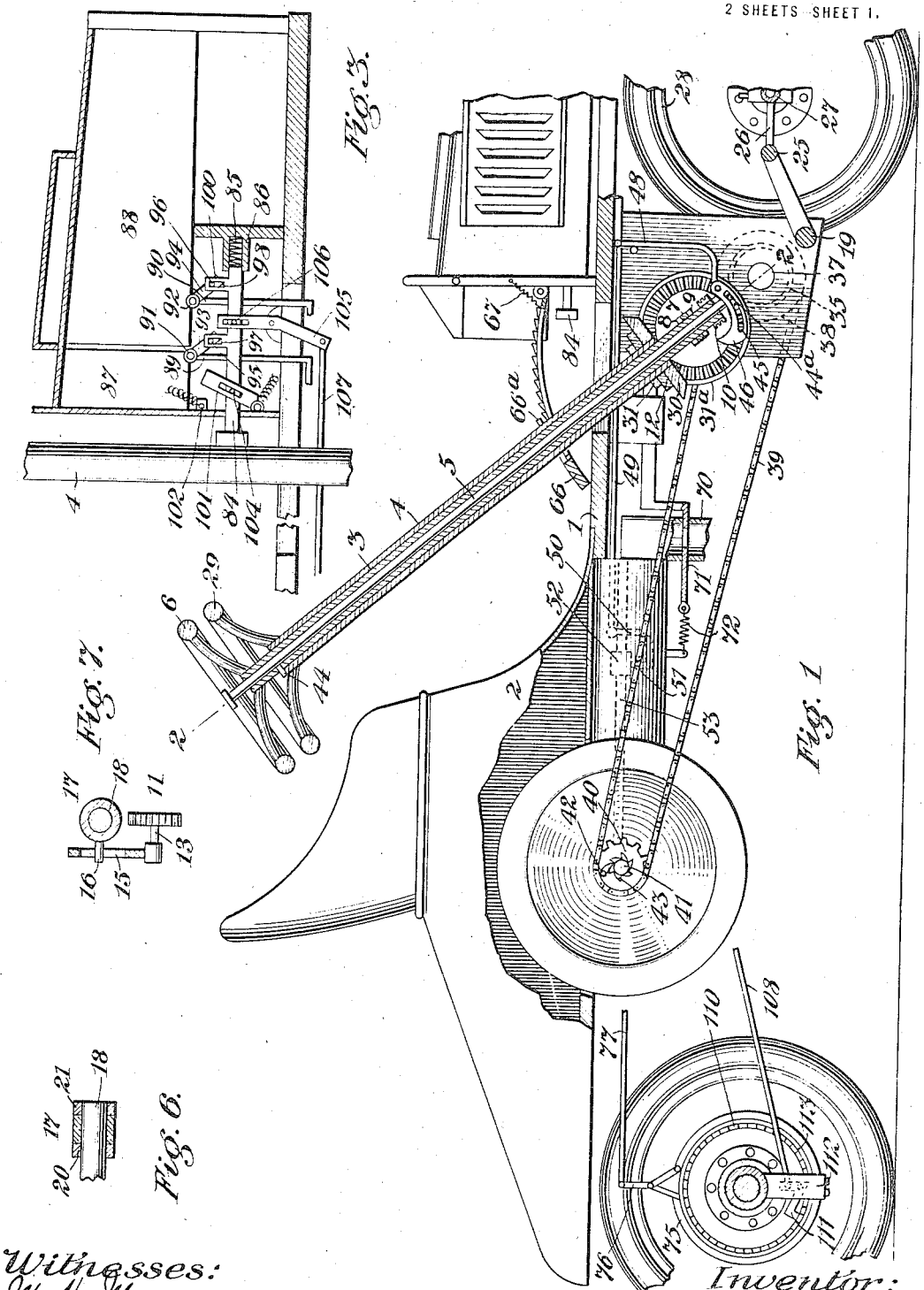

W. H. MUZZY.
MOTOR VEHICLE.
APPLICATION FILED DEC. 29, 1910.

1,161,006.

Patented Nov. 16, 1915.
2 SHEETS—SHEET 2.

Witnesses:

Inventor:

UNITED STATES PATENT OFFICE.

WILLIAM H. MUZZY, OF DAYTON, OHIO.

MOTOR-VEHICLE.

1,161,006.	Specification of Letters Patent.	Patented Nov. 16, 1915.

Application filed December 29, 1910. Serial No. 599,979.

*To all whom it may concern:*

Be it known that I, WILLIAM H. MUZZY, a citizen of the United States, residing at Dayton, in the county of Montgomery and State of Ohio, have invented certain new and useful Improvements in Motor-Vehicles, of which I declare the following to be a full, clear, and exact description.

This invention relates to improvements in motor vehicles and has more particular relation to improvements in controlling mechanisms for the same.

One of the several objects of the invention is to provide improved controlling devices for the machine which are in turn controlled from the steering column or pillar.

Another object of the invention is to provide improved devices for the control of the machine which may be operated in several different ways at the option of the driver, to accomplish the same results.

A further object of the invention is to provide devices which are automatic in their operation, for controlling the several functions of the motor without special attention from the driver.

There are also other objects of the invention which will be apparent from the following description.

The invention consists of certain novel constructions, combinations and arrangements of parts, all of which will be hereinafter more particularly described and claimed.

In the accompanying drawings forming part of this specification: Figure 1 represents a side elevation, partly in section of a motor vehicle with my improvements applied thereto; Fig. 2 represents a detail section of the steering post and connections taken on the line 2—2 of Fig. 1; Fig. 3 represents a detail vertical section through the hood or bonnet showing the controlling devices which are operated by the steering pillar; Fig. 4 represents a detail side elevation of the adjustable controlling disk and its connections; Fig. 5 represents a detail elevation of the same looking in the direction of the arrow shown in Fig. 4; Fig. 6 represents a detail side elevation, partly in section, of the laterally movable steering shaft and its ring connection with the gear segment; and Fig. 7 represents a side elevation of the same partly in section, the segment and its link being also shown.

Before starting upon a detail description of the several constructions which comprise this invention I first wish to state generally the weak points of construction which are now present in motor vehicles or motors being sold upon the market.

There are two functions, in the present motor vehicles, which require the expenditure of considerable energy of the operator and these are the starting of the motor and the application of the brakes. These functions are at present controlled by small levers and cranks giving very little leverage. It is not practical to increase the leverage of these parts as they are at present arranged but there is one part in a motor vehicle which performs another function and is of considerable length and leverage. This part is the steering post and I have utilized this post and other companion parts for securing the desired power for controlling the several functions of the machine. I have also provided devices whereby this steering post is made to control all the functions of the machine without any particular attention from the operator.

In the accompanying drawings 1 represents the frame of the machine, 2 the engine, 3 the steering post and 4 the auxiliary controlling post. The steering post 3 is hollow and supports a spark lead rod 5 which is arranged to be moved longitudinally therein to lead or retard the spark as desired. This post 3 is provided with the usual operating wheel 6 at its upper end and is journaled and supported by a shaft 7 as best shown in Fig. 2; suitable collars 8 and 9 being mounted on the post on the opposite sides of the head of the shaft through which the post passes. These collars prevent any longitudinal movement of the post in either direction but the post is free to swing with the shaft 7 as a fulcrum. The post is further braced by devices hereinafter described. The lower end of this post 3 is provided with a worm wheel 10 which meshes with a segmental gear 11 which is pivoted upon a frame 12. The gear 11, as best shown in Figs. 2 and 7 is mounted upon a short shaft 13 which is journaled in said frame 12 and carries a vertically extending arm 14 slotted at its upper end, as at 15 to receive a pin 16 which is mounted upon a sleeve 17. This latter sleeve, as best shown in Fig. 6, is loosely journaled on a shaft 18 forming part of a frame 19, and having the same axis as the shaft 7. The sleeve 17 while free to rotate upon the shaft 18 is held from longitudinal movement independently of the same, by two collars 20 and 21 fast to said shaft 18. By the above described devices the rocking of the segment 11 in either direction will cause a longitudinal movement of the shaft 18 and the frame 19. This shaft 18 as well as the lower portion of the frame 19 are mounted to slide laterally in pendent frame plates 22 and 23 secured to the main frame 1. A turn buckle 24 is included in the lower rod of the frame 19 to adjust the relation of the frame 19 to a cross bar 25 which is connected to said frame and also to the steering knuckles 26 which are mounted in the ends of the axle 27 and carry the front wheels 28. It will be seen from the above that the free rotary movement of the sleeve 17 permits the segmental gear and its connected parts to swing with the steering post without disturbing the connection with the frame 19. The frame 12 is of yoke formation and is journaled upon the shaft 7 and sleeve 32 whereby it may rock and follow the movements of the steering post. The upper part of this frame 12 also forms a support for the hollow post or sleeve 4 which supports a controlling wheel 29 at its upper end and is provided at its lower end with a bevel gear 30. A collar 31 is also mounted on said sleeve above the frame 12 to prevent any longitudinal movement of the sleeve. The gear 30 meshes with a similar gear 31 which is fast upon a sleeve 32 journaled upon the shaft 7. The sleeve 32 thus supports the shaft 7 and is in turn supported by the frame plate 23. The outer end of the sleeve 32 is provided with a gear 33 which is formed in its outer face near its periphery with a series of recesses 34. The gear 33 meshes with a pinion 35 fast to a sleeve 36 which is journaled upon a short shaft 37 mounted rigidly in the plate 23. The outer end of the sleeve 36 carries a sprocket wheel 38 which is connected by a chain 39 to a smaller sprocket wheel 40 loosely mounted upon the motor shaft 41 and provided with a pawl 42 which is arranged to engage a ratchet wheel 43 fast to the motor shaft. By this means the wheel 40 causes the motor shaft to revolve with it in one direction but leaves the motor shaft free to turn ahead independently after the motor is started as will be readily understood.

It will be seen from the above description that the gear 33 may be operated in two ways to start the motor. The first method of operating it would be to move the steering post to a vertical position and then draw it down suddenly to its normal position, meanwhile holding the wheel 29 from turning. If desired the post may be drawn down by grasping the wheel 29. The above movement of the steering post will result in the oscillation of the gear 33. The gearing intermediate this gear and the motor shaft is so proportioned that this movement will be sufficient to give the motor shaft the extent of movement necessary to start the motor.

If desired the downward movement of the steering post may be accompanied by a rotary movement of the wheel 29 thus giving an additional movement to the gear 33 to start the motor. When so desired the motor may be started by simply rotating the wheel 29 in the proper direction. This may take place with the steering post in any of its positions of inclination.

The preferred method of starting the motor however is to simply grasp the wheel 6 and draw the same together with the steering post toward the operator; the post having been previously moved to its vertical position upon the operator leaving the car. In such an operation means must be provided for preventing the turning of the wheel 29 as it is not always convenient to take hold of this wheel at the same time. This means comprises a lug 44 carried by the rod 5, as plainly shown in Fig. 1, and projecting into corresponding notches formed in the upper edges of the sleeves 3 and 4, when the rod is in its lowered position. As this rod controls the spark lead as hereafter described, it will be seen that the motor cannot be started in the above manner unless the spark lead has been fully retarded. This construction always gives a retarded spark for starting without any attention from the driver. After the steering post has been drawn forward the spark must of course be led and in so doing the two wheels are unlocked so that the steering wheel may be rotated free of the wheel 29.

As it is desirable at times to start the motor from the wheel 29 alone means must be provided for automatically retarding the spark to the full extent by the action of moving the steering post to its vertical position in leaving the car. This means comprises a stud 44$^a$ projecting laterally from the lower end of the rod 5 and through a curved slot 45 formed in a cam lever 46, which, as best shown in Fig. 2, is fast upon one end of a short shaft 47 mounted to rock in the plate 22. This shaft, as shown in Fig. 1, is provided with a vertically extending arm 48 which is connected by a link bar 49 to a bell-crank lever 50 which in turn is connected by a link 51 to the contact block 52 mounted on the cam shaft 53 of the motor. The movement of the block retards or advances the spark lead in a manner well known in the art and needing no further description here. When the cam lever 46 is in its normal position shown in Fig. 1 its slot is concentric to the shafts 7 and 18 but when the spark is advanced by drawing upon the rod 5 the slot is brought into an eccentric position so that when the steering post is moved forward the lever 46 will be gradually returned toward its normal position thus retarding the speed of the engine by the movement of the steering post forward as will be hereinafter more fully described. As this return of the lever 46 as above described is dependent upon the frictional contact between the rod 5 and the sleeve 3 I provide means whereby the lever 46 is positively returned should the above devices not effect its return. For this purpose the upper edge of the lever 46 is of cam formation and is arranged to be struck by the lower edge of the worm wheel 10 as the steering post is moved forward as plainly shown in Fig. 1. The slight vertical movement that must be given to the rod 5 to disengage the lug 44 from the notches in the tops of the sleeves 3 and 4, when it is desired to start the motor by the wheel 29, is not sufficient to materially affect the lead of the spark.

The shaft 7 supports a laterally movable clutch and controlling disk 55 which is provided upon one side with a series of laterally projecting pins 56 which are arranged to enter the notches formed in the gear 33 when the disk is moved laterally and thus couple the two together. When the motor is being started the disk is held out of engagement with the gear 33 by a pivoted clutch lever 57 which engages the walls of a channel 58 formed in a collar 59 connected to said disk. The upper end of the lever 57 is pivotally connected to a link bar 60. This bar is provided with a pin 61 which projects into a slot 62 formed in a pivoted foot lever 63 which is mounted in the main frame and is normally forced upward to throw the clutch into connection with the gear 33 by a coil spring 64 interposed between the pedal and the main frame.

When the operator's foot is placed upon the pedal as shown in Fig. 2, the clutch is moved out of engagement with the gear 33 and the latter is thus free to move independently for starting the motor. A slight pressure upon the pedal 63 will not disengage the clutch from the gear 33 but this pressure is sufficient to operate the pivoted and slotted ratchet bar 66 mounted upon the main frame and normally drawn up against pins 66ª mounted upon the sleeve 4 by a coil spring 67 that connects it to the main frame as shown in Fig. 1. The steering and controlling posts pass through the slot of this ratchet bar. A slotted link bar 68 connects the ratchet bar 66 to the foot pedal so that when the motor is being started the teeth of said bar may be moved clear of the pins on the sleeve 4. The slot and pin connection between the bar 68 and the foot pedal however allows the ratchet bar to be depressed by the foot without depressing the foot pedal as for instance when it is desired to move the steering post farther toward the rear in controlling the motor. It will be seen from the above that the ratchet bar only prevents the steering post being moved rearward and allows free forward movement of the same. This construction provides a support for holding the steering post in any of its adjusted positions of control.

As above described the steering post has been utilized for starting the motor and controlling the spark lead but in addition to this the post also controls the brake, the switch, the lubricating oil, the gasolene supply, and the sprag, as well as the throttle of the motor.

The brake and the throttle of the motor are controlled from the disk 55 in the following manner: By reference to Fig. 1 it will be seen that the gas supply pipe 70 of the motor is provided with an apertured throttle slide 71, which is normally held in its open position shown in Fig. 1, by a spring 72 which connects it to the engine cylinder. The forward end of the slide 71 is suitably guided in the main frame and is connected to the disk 55 by a coil spring 73 as best shown in Fig. 4. The office of this spring is to permit additional movement of the disk after the throttle is fully closed to subsequently apply the brake. This brake comprises an annular flange applied to each of the rear wheels and about each of which a band brake 75 passes. These brakes are applied by levers 76 which are in turn actuated by rods 77 which are suitably linked together and are connected to a rod 78 slotted at its forward end as at 79. A pin 80 mounted on the disk 55 projects through the said slot and the relative arrangement of the parts is such that the rod 78 will commence to move just after the throttle has been fully closed. The machine is thus throttled before the brake can be applied and without any special attention from the operator. He simply pushes forward upon the steering post and the engine is gradually throttled and the brake finally applied. At the same time the spark is gradually retarded in the manner before described. As the post is pushed forward it is held against retrograde movement by the ratchet plate 66 but can be instantly released if desired to allow the post to swing back again, by depressing the rear end of the plate 66 with the foot. When it is desired to move the steering post to its vertical position the pedal 63 is depressed and the disk 55 disengaged from the gear 33 thus disconnecting the post from the brake and the throttle, the latter returning automatically to its engine starting position in which the feed pipe is only partly open and the engine thus throttled down to prevent racing. When the pedal 63 is released the throttle slide is moved automatically to fully open the feed pipe 70 as shown in Fig. 1. This automatic movement of the throttle slide is effected by the lateral movement of the disk 55 under the influence of the spring 64. When the disk moves laterally in this manner a stud 81 projecting from the periphery of the same contacts with the cam edge 82 of a lug 83 which is mounted on the plate 23 and the disk is thus rotated slightly to draw upon the spring 73 and draw the throttle slide to the position shown in Fig. 1. The lug 83 also acts as a stop for the disk 55 to arrest it in its normal position when it moves back after being released from the gear 33.

The above described devices provide for the control of the throttle, the brake and the spark lead as well as the starting of the motor and the steering.

The throttle control, the spark lead and the brake control are accomplished by the steering post or the auxiliary post as desired without in anywise interfering with the regular steering action of the steering post. When it is desired to control the above functions without moving the steering post back and forward the wheel 29 is simply rotated in one direction or the other to move the disk 55 correspondingly. It is thus optional with the operator in what manner he will control the functions of the car and he can at will change from one means of control to the other without any adjustment of parts. As the motor cannot be started unless the pedal 63 is depressed it will be seen that the throttle slide must always be in the motor starting position at this time and no damage can be done by giving the motor too great a charge in starting.

The above functions relate to the regular starting and running of the machine and I will now pass on to the description of the devices which come into operation when the machine and motor are to be stopped. These devices, as best shown in Fig. 3 comprise a headed rod 84 which is normally projected into the path of the steering post or the sleeve surrounding the same by a coil spring 85 which is mounted in a suitable housing 86 of the hood frame and engages the inner end of the said rod. When the steering post is moved to its vertical position to allow the occupant to leave the car more conveniently, the rod 84 is forced inward against the tension of its spring and by this movement the oil and gasolene are turned off, the switch operated to break the circuit and sprags dropped into engagement with the rear wheels to lock the machine against any possible movement. For this purpose the oil tank 87 and the gasolene tank 88 are provided with feed pipes 89 and 90 respectively which are in turn provided with cocks 91 and 92. These cocks have operating arms 93 and 94 which are provided with round pins 95 and 96 which project into slots 97 and 98 formed in arms 100 carried by the rod 84. When the devices are in the position shown in Fig. 3 the oil and gasolene are turned off but when the steering post is drawn forward to start the motor the oil and gasolene are automatically turned on. This movement also actuates a pivoted switch arm 101 to bring the same into contact with a switch contact spring 102 and thus complete the circuit. The rod 84 is connected to the switch arm 101 by a pin 104 thereon and projecting into a slot formed in the arm. A pivoted lever 105 mounted upon the main frame is slotted at its upper end to receive a pin 106 projecting from the rod 84. The lower end of the lever 105 is connected to a link rod 107 which in turn is connected to two sprag rods 108. Mounted upon the hub of each rear wheel is a rigid toothed ring 110 with which coöperates a pivoted locking dog 111 of bell-crank formation. This dog is supported upon a brace plate 112 which also supports the brake hub 113 and is normally held out of engagement with the toothed ring 110 as shown in Fig. 1. When the steering post is moved fully to its vertical position however and the rod 84 forced fully inward the locking dogs are forced into engagement with the toothed rings and the rear wheels are thus effectually locked against movement in either direction.

It will be observed that all of the above operations are automatic and are controlled from the steering post without any attention from the operator as they accompany the usual movements of the steering post in entering or leaving the machine.

Let us suppose that the machine is at rest and the motor still. The operator now steps into the machine and after depressing the pedal 63 he grasps the wheel 29 and draws the steering post rapidly toward him. This single operation accomplishes the following results: The oil and gasolene are turned on, the switch is operated, the sprags are thrown out of engagement with the wheels and the motor is started. The operator now advances the spark to the proper position and thereafter fully controls the machine by simply moving the steering post back and forth as desired. Or in lieu of this movement he controls by rotating the wheel 29.

Should the operator get into a tight place and desire to make a sudden stop he simply presses with his foot upon the head of the rod 84 when the machine is instantly arrested and the engine stopped. If so desired independent rods for the control of the switch, oil, gasolene and sprags could be arranged so that one or the other of the devices could be adjusted without the other. The outward movement of the rod 84 could also be made positive if so desired by providing said rod with a spring slip which would take hold of the steering post.

I do not care to limit my invention to a steering post for accomplishing the different operations as any other form of lever or crank may be employed to accomplish the functions which I have shown as controlled by the steering post.

It will of course be understood that the invention is not limited to the particular form of steering post shown as the invention can also be applied to many other forms of steering mechanism such as the tiller post or lever and the vertical post with controlling lever at the top.

I also do not care to limit my invention to the constructions of the controlling devices for the oil, gasolene, spark brake and sprags as any other desired constructions may be employed at the points shown or in proximity to the parts affected without departing from the spirit of my invention. For instance the oil and gasolene controlling devices might be mounted directly upon the engine and connected to the controlling parts by any suitable links or levers.

It will of course be understood that the oil tank is not only connected to the engine cylinder but also to the bearings and any other part of the machine in which a constant supply of oil is desirable.

It will also be observed that the operator cannot forget certain operations in starting, stopping and controlling the machine, as the performance of all of the functions of the machine automatically follows the movements of the steering post without any thought from the operator.

Having thus described my invention what I claim as new and desire to secure by Letters Patent is:

1. In a motor vehicle the combination with the running gear, of a gas motor, a lever steering post pivoted to swing as a whole having permanent connection with the running gear, and gearing actuated by the tilting action of the steering member for manually turning over the motor to start it.

2. In a motor vehicle the combination with a running gear, of a gas motor, a lever steering post pivoted to swing as a whole, and gearing for manually turning over the motor to start it and for controlling the motor, the gearing being controlled by the tilting action of the steering post.

3. In a motor vehicle the combination with a running gear, of an explosive motor, a brake, a steering member pivoted to swing as a whole, and gearing controlled by the tilting action of the steering member for manually turning the motor over to draw its charge of gas and also for applying the brake.

4. In a motor vehicle the combination with a running gear, of a gas motor, a tilting steering post, and gearing for manually turning over the motor to start it, controlled by the tilting action of said post.

5. In a motor vehicle the combination with a running gear, of a gas motor, a tilting steering member pivoted to swing as a whole having a rotary steering action, and gearing actuated by the tilting action of the steering member for manually turning over the motor to start it.

6. In a motor vehicle the combination with a running gear, of a gas motor, a tilting steering member pivoted to swing as a whole, and gearing for manually turning over the motor to start it by tilting the member into operating position.

7. In a motor vehicle the combination with a running gear, of a gas motor, a steering member pivoted to swing as a whole, a throttle for the motor, and gearing controlled by the tilting action of the steering member for manually turning over the motor to start it and governing the throttle.

8. In a motor vehicle the combination with a running gear, of a motor, a steering member, a brake, a switch for the motor circuit, and oil tank and connections, a gasolene tank and connections, means controlled by the steering member for turning on and off the oil, the gasolene and the switch, and means for applying the brake by the steering member.

9. In a motor vehicle the combination with a running gear, of a motor, a pivoted steering member, a spark controlling device connected to the motor, means for starting the motor from the steering member and means for leading or retarding the spark by the tilting action of the steering member.

10. In a motor vehicle the combination with a running gear, of a motor, a pivoted steering member, a spark controlling device connected to the motor, and means for leading or retarding the spark by the tilting movement of the steering member.

11. In a motor vehicle the combination with a running gear, of a motor, a tilting steering member for turning over the motor, a spark controlling device connected to the motor and means for automatically retarding the spark lead when the steering member is moved toward a vertical position.

12. In a motor vehicle the combination with a running gear, of a motor, a steering post having both tilting and rotary movements, a switch controlling the motor circuit, oil and gasolene supply devices, and means for controlling the switch and the oil and gasolene supply devices by the steering post.

13. In a motor vehicle the combination with a running gear, of a motor, a steering member with connections, for starting the motor and starting devices independent of the steering member for starting the motor.

14. In a motor vehicle the combination with a running gear, of a motor, a steering member, means for starting the motor from the steering member by moving the latter, and means mounted upon the steering member for starting the motor without moving the steering member at the option of the driver.

15. In a motor vehicle the combination with the running gear, of a motor, a starting means for the motor, a steering post for actuating said starting means, and means mounted upon the steering post but independently movable for actuating said starting means.

16. In a motor vehicle the combination with a running gear, of an explosive motor, a tilting steering post, and a starting means for turning over the motor to start it concentric with the fulcrum of the steering post and operated by the tilting action of the same.

17. In a motor vehicle the combination with a running gear, of a motor, a steering post having a tilting movement for starting the motor, a spark controlling device connected to the motor, means for starting the motor connected to the steering post and means for retarding the spark when the steering post is starting the motor.

18. In a motor vehicle the combination with a running gear, of a motor, sparking devices for the motor, a tilting steering post and means for turning over the motor controlled by the tilting action of the post for retarding the spark.

19. In a motor vehicle the combination with a running gear, of a motor, spark controlling devices for the motor, a tilting steering member for turning over the motor and means for leading or retarding the spark by the tilting action of the steering member.

20. In a motor vehicle the combination with a running gear, of a motor, a tilting steering post, a controlling sleeve concentric with said post and independently movable, a fulcrum journal for the steering post, a sleeve surrounding said fulcrum journal and connected to the first mentioned sleeve and controlling means for the motor connected to the fulcrum sleeve.

21. In a motor vehicle the combination with a running gear, of a tilting steering post, steering devices for the vehicle wheels mounted to move longitudinally in the fulcrum plane of the post and means connecting said post and steering devices whereby the post may be tilted without affecting said devices.

22. In a motor vehicle the combination with a running gear, of a motor, a tilting steering post, a sleeve surrounding said post, a movable member actuated either by the steering post or said sleeve or both, and means connecting the movable member to the motor for manually starting the same.

23. In a motor vehicle the combination with a running gear, of a tilting steering post, a fulcrum device for said post, means actuated by the post for moving the fulcrum device longitudinally without changing the pivotal relation of the post and fulcrum, and means connecting the fulcrum device to the steering wheels.

24. In a motor vehicle the combination with a running gear, of a steering post, a fulcrum shaft for the post permitting movement at right angles to its rotation, a worm and gear controlled by the post for moving the fulcrum shaft longitudinally, and means connecting the fulcrum shaft to the steering wheels.

25. In a motor vehicle the combination with a running gear, of a tilting steering post, a motor, a controlling sleeve surrounding the steering post, a fulcrum shaft for the steering post, a journal sleeve surrounding said shaft, bevel gears connecting the controlling sleeve and the journal sleeve and means for starting the motor from the journal sleeve.

26. In a motor vehicle the combination with a running gear, of a motor, a tilting steering post and a spark lead controlling device, and connections concentric with the steering post and operated in the tilting of the post.

27. In a motor vehicle the combination with a running gear, of a steering post, a motor, a motor starting member mounted on and moving with said post, and a spark lead controlling device for locking the post and member for simultaneous operation whereby the motor cannot be started unless the spark is fully retarded.

28. In a motor vehicle the combination with a running gear, of a steering member, a fulcrum shaft for the steering member connections between the steering member and shaft for moving the latter longitudinally to effect the steering without changing the pivotal relations and means for connecting the shaft to the steering wheels.

29. In a motor vehicle the combination with a running gear, of a motor, sparking devices for the motor, a starting means for the motor, and a spark controlling device and connections which by its movement couples the starting means to the motor only when the spark has been retarded.

In testimony whereof I affix my signature in the presence of two witnesses.

WILLIAM H. MUZZY.

Witnesses:
  M. H. Muzzy,
  E. J. Finke.